US009632702B2

(12) United States Patent
Song et al.

(10) Patent No.: US 9,632,702 B2
(45) Date of Patent: Apr. 25, 2017

(54) EFFICIENT INITIALIZATION OF A THINLY PROVISIONED STORAGE ARRAY

(71) Applicant: INTERNATIONAL BUSINESS MACHINES CORPORATION, Armonk, NY (US)

(72) Inventors: Cheng-Chung Song, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/515,170

(22) Filed: Oct. 15, 2014

(65) Prior Publication Data

US 2016/0110111 A1    Apr. 21, 2016

(51) Int. Cl.
G06F 12/00    (2006.01)
G06F 3/06    (2006.01)

(52) U.S. Cl.
CPC .......... *G06F 3/0607* (2013.01); *G06F 3/0632* (2013.01); *G06F 3/0688* (2013.01)

(58) Field of Classification Search
CPC ........................... G06F 12/0246; G06F 3/0679
See application file for complete search history.

(56) References Cited

U.S. PATENT DOCUMENTS

| 7,711,897 | B1 * | 5/2010 | Chatterjee | G06F 3/0605 711/112 |
| 7,962,687 | B2 | 6/2011 | Torabi | |
| 8,275,981 | B2 | 9/2012 | Moshayedi | |
| 8,484,414 | B2 * | 7/2013 | Sugimoto | G06F 3/0616 711/103 |
| 2008/0201661 | A1 | 8/2008 | Haynes et al. | |
| 2009/0300302 | A1 * | 12/2009 | Vaghani | G06F 3/0605 711/162 |

(Continued)

FOREIGN PATENT DOCUMENTS

EP    1938200    9/2013

OTHER PUBLICATIONS

LiPin Chang et al., "An Efficient Management Scheme for LargeScale Flash Memory Storage Systems", 2004 ACM.

(Continued)

*Primary Examiner* — Ryan Bertram
*Assistant Examiner* — Trang Ta
(74) *Attorney, Agent, or Firm* — Brian F. Russell; Randall J. Bluestone

(57) ABSTRACT

In at least one embodiment, a data storage system has a plurality of non-volatile storage devices, a higher level controller and one or more lower level controllers. In response to one or more inputs, the higher level controller of the data storage system issues an initialization command specifying initialization of a storage extent. In response to the initialization command, one or more lower level controllers issue dataless initialization commands to the plurality of non-volatile storage devices. In response to the dataless initialization commands, multiple first non-volatile storage devices among the plurality of non-volatile storage devices each initialize a respective data portion of the storage extent and a second non-volatile storage device among the plurality of non-volatile storage devices initializes a data protection portion of the storage extent.

13 Claims, 9 Drawing Sheets

(56) References Cited

U.S. PATENT DOCUMENTS

| | | | |
|---|---|---|---|
| 2010/0082931 A1* | 4/2010 | Hatfield | G06F 3/067 |
| | | | 711/166 |
| 2011/0029728 A1* | 2/2011 | Popovski | G06F 3/0611 |
| | | | 711/114 |
| 2012/0239853 A1 | 9/2012 | Moshayedi | |
| 2013/0166820 A1* | 6/2013 | Batwara | G06F 12/0246 |
| | | | 711/103 |
| 2014/0095758 A1 | 4/2014 | Smith et al. | |
| 2014/0108708 A1 | 4/2014 | Borchers et al. | |

OTHER PUBLICATIONS

Chin-Hsien Wu et al., "The Design of Efficient Initialization and Crash Recovery for Log-based File Systems Over Flash Memory", 2006 ACM.

\* cited by examiner

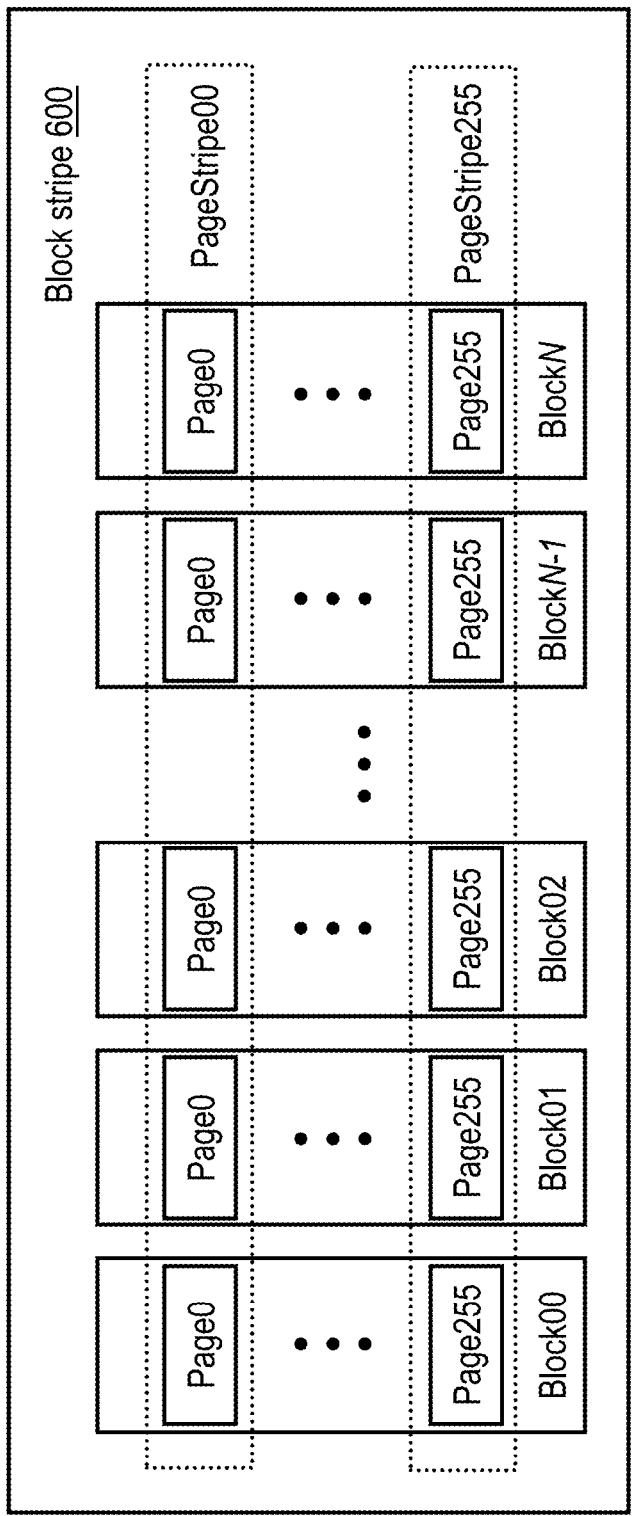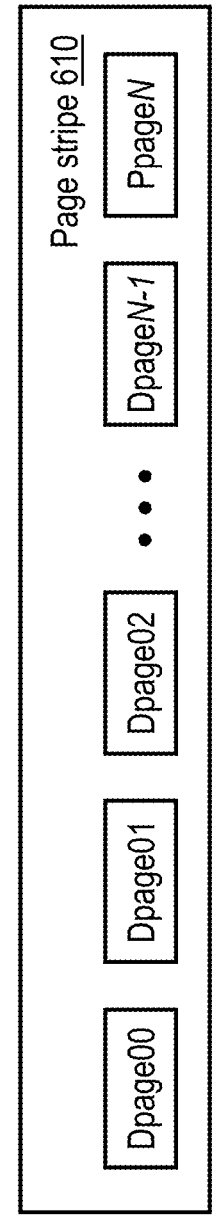
Fig. 6A
Fig. 6B

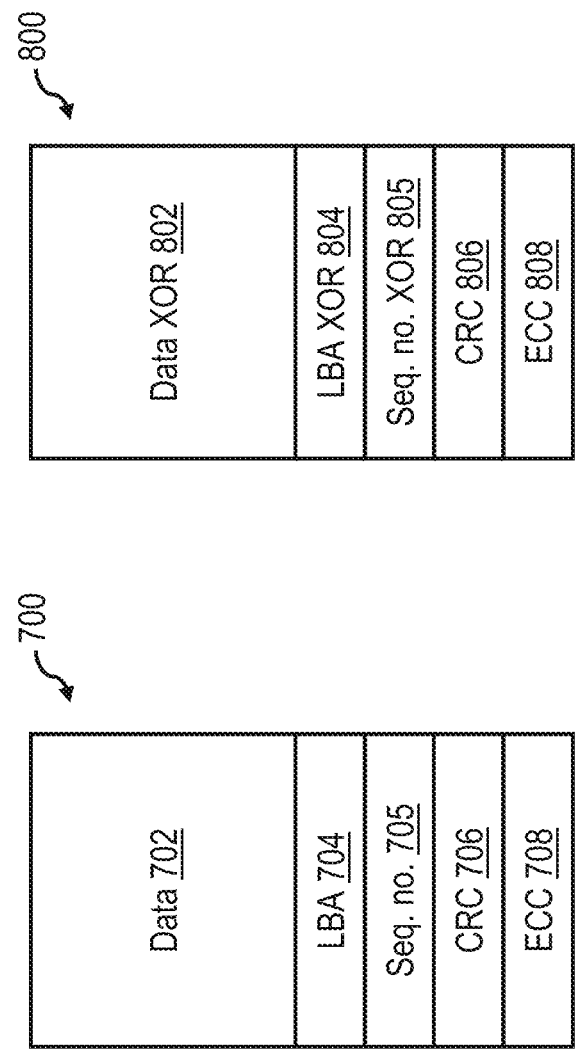

EFFICIENT INITIALIZATION OF A THINLY PROVISIONED STORAGE ARRAY

BACKGROUND OF THE INVENTION

This disclosure relates to data processing and storage, and more specifically, to efficient initialization of a thinly provisioned data storage system, such as a flash memory system.

The physical storage media of data storage systems can be managed utilizing different management techniques, including thick and thin provisioning. In thick provisioning, storage volumes are created by a storage manager with the entire size of the volume pre-allocated on physical storage media when the volume is created. While simplifying implementation and management, thick provisioning can leave large amounts of storage capacity unused. Thin provisioning, on the other hand, promotes greater utilization of storage capacity by allowing the storage manager to over-allocate volume sizes with respect to the actual capacity of the physical storage media and then subsequently reserve physical storage for a volume as needed. Consequently, in a data storage system employing thin provisioning (and/or other functions such as volume migration), storage extents are constantly being allocated to a volume and then freed.

With enterprise-class storage, each sector of the storage contains additional metadata utilized by the storage manager to perform integrity checking. For example, in one common implementation, the metadata can be a T10 standard data integrity field (DIF). Currently, when a storage extent allocated to a volume is freed, the storage extent is written with data of all zeros. When the storage extent is subsequently allocated to another volume, the storage extent is again initialized by writing the extent with data of all zeros and by computing and writing the corresponding metadata for each sector to the storage extent.

BRIEF SUMMARY

In view of the frequency of storage extent allocation and free operations in data storage system employing thin provisioning and/or other functions, such as volume migration, the present disclosure recognizes that it would be desirable to be able to achieve increased efficiency in initializing and freeing storage extents in data storage systems.

In at least one embodiment, a data storage system has a plurality of non-volatile storage devices, a higher level controller and one or more lower level controllers. In response to one or more inputs, the higher level controller of the data storage system issues an initialization command specifying initialization of a storage extent. In response to the initialization command, one or more lower level controllers issue dataless initialization commands to the plurality of non-volatile storage devices. In response to the dataless initialization commands, multiple first non-volatile storage devices among the plurality of non-volatile storage devices each initialize a respective data portion of the storage extent and a second non-volatile storage device among the plurality of non-volatile storage devices initializes a data protection portion of the storage extent.

BRIEF DESCRIPTION OF THE SEVERAL VIEWS OF THE DRAWINGS

FIG. 6A depicts an exemplary implementation of a block stripe in accordance with the present disclosure;

FIG. 6B depicts an exemplary implementation of a page stripe in accordance with the present disclosure;

FIG. 7 illustrates an exemplary data page in accordance with the present disclosure;

FIG. 8 depicts an exemplary data protection page in accordance with the present disclosure;

DETAILED DESCRIPTION

Figure 1A:
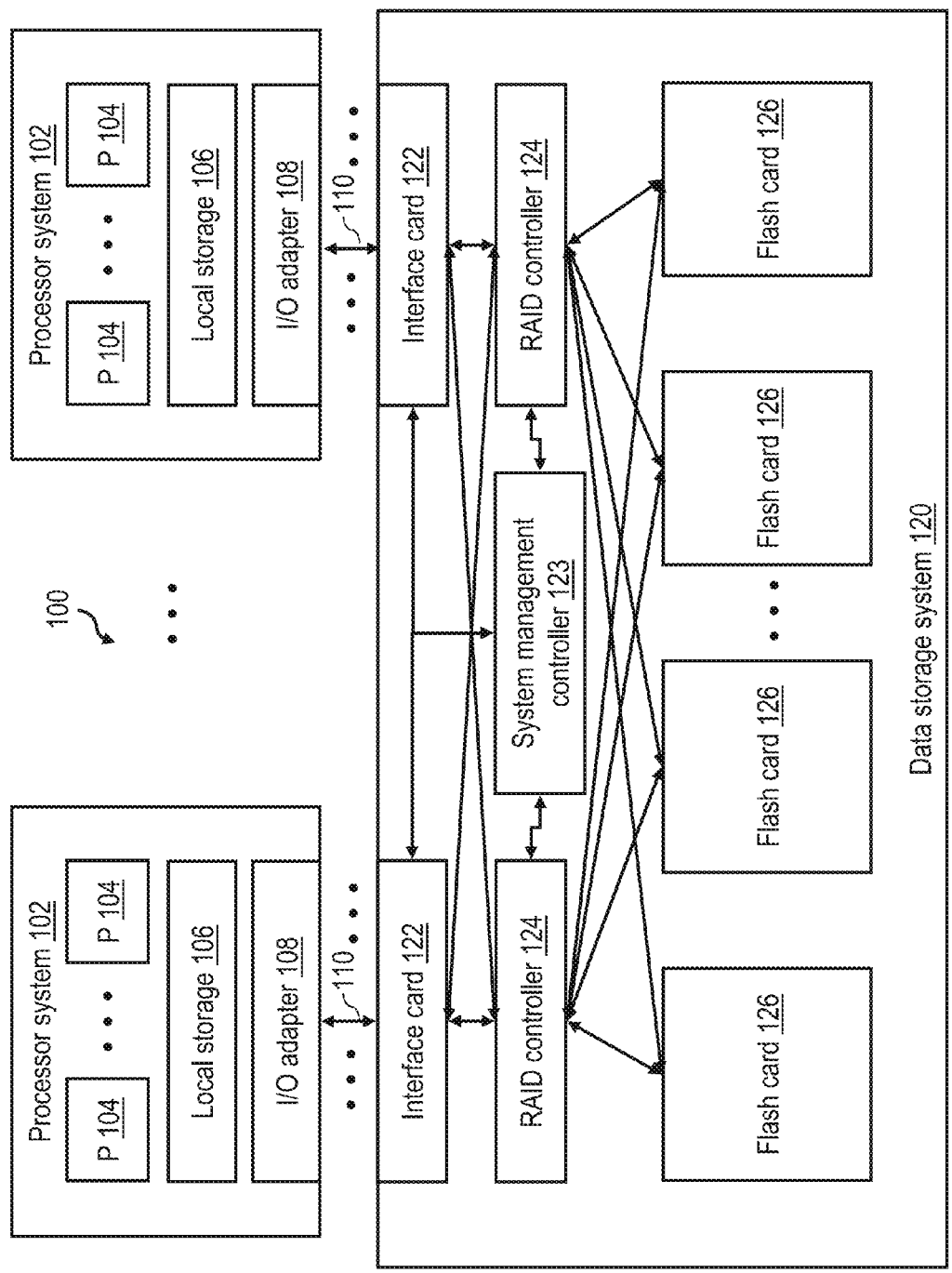
FIG. 1A is a high level block diagram of a data processing environment in accordance with one embodiment.

With reference now to the figures and with particular reference to FIG. 1A, there is illustrated a high level block diagram of an exemplary data processing environment 100 including a data storage system as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, Power, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, Fibre Channel (FC), FC over Ethernet (FCoE), Internet Small Computer System Interface (iSCSI), Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface cards 122 through which data storage system 120 receives and responds to IOPs 102 via I/O channels 110. Each interface card 122 is coupled to each of multiple Redundant Array of Inexpensive Disks (RAID controllers 140 in order to facilitate fault tolerance and load balancing. Each of RAID controllers 140 is in turn coupled (e.g., by a PCIe bus) to each of multiple flash cards 126 including, in this example, NAND flash storage media. In other embodiments, alternative and/or additional non-volatile storage devices can be employed. In the depicted embodiment, the operation of data storage system 120 is managed by a system management controller 123, which is coupled to interface cards 122 and RAID controllers 124. In various embodiments, system management controller 123 can be implemented utilizing hardware or hardware executing firmware and/or software.

Figure 1B:
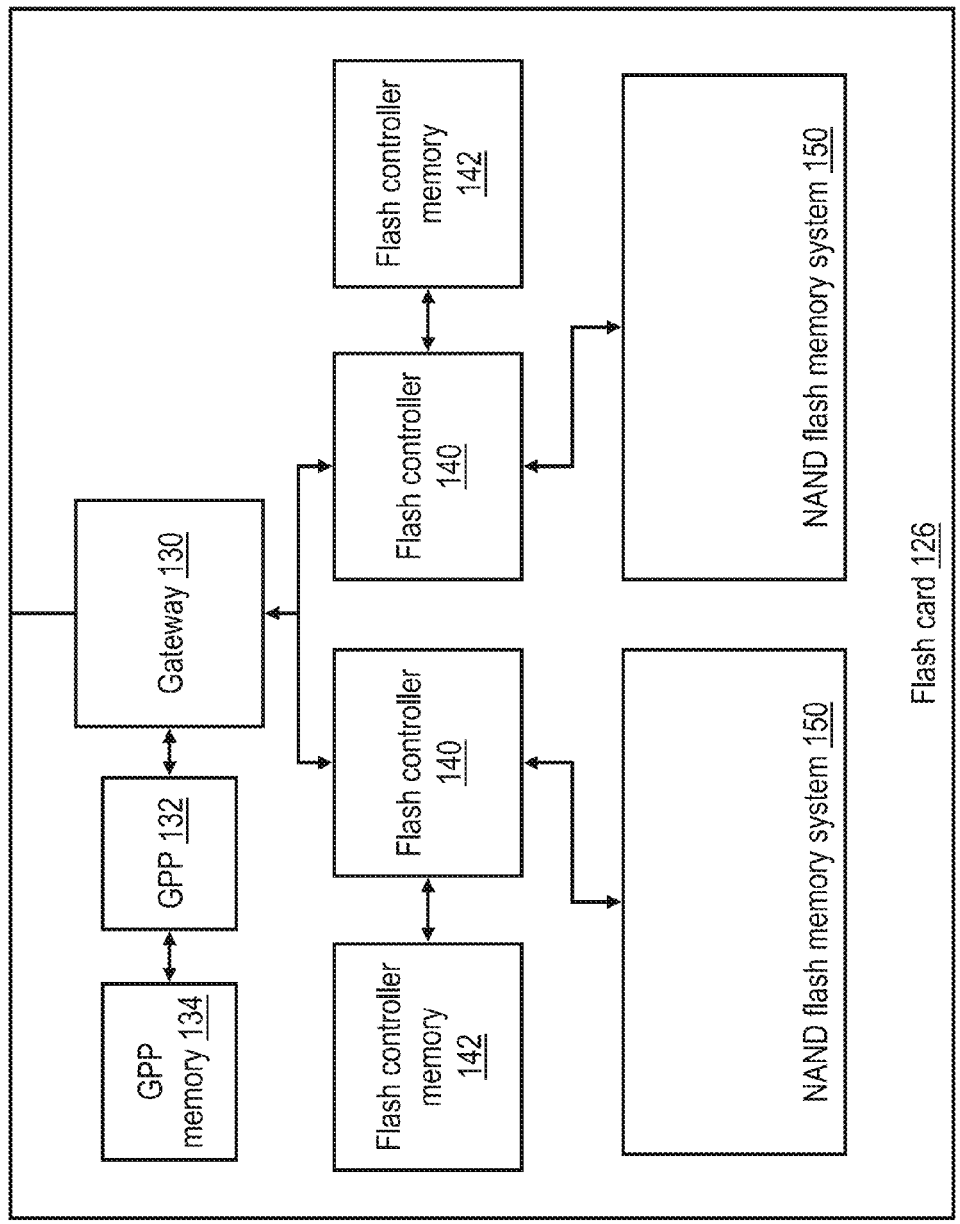
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. In the illustrated example, flash card 126 includes a gateway 130 that serves as an interface between flash card 126 and RAID controllers 140. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory array 140 and/or to store data in NAND flash memory array 140. Flash controllers 140 service these IOPs, for example, by accessing NAND flash memory array 150 to read or write the requested data from or into NAND flash memory array 150 or by accessing a memory cache (not illustrated) associated with NAND flash memory array 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory arrays 150, is constrained by its construction such that the smallest granule of data that can be accessed by a read or write IOP is fixed at the size of a single flash memory page, for example, 16 kilobytes (kB). The LBA provided by the host device thus corresponds to a page within a logical address space. The flash translation layer translates this LBA into a physical address assigned to a corresponding physical location in a NAND flash memory array 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 suitable for an enterprise-class system in accordance one exemplary embodiment.

Figure 2:
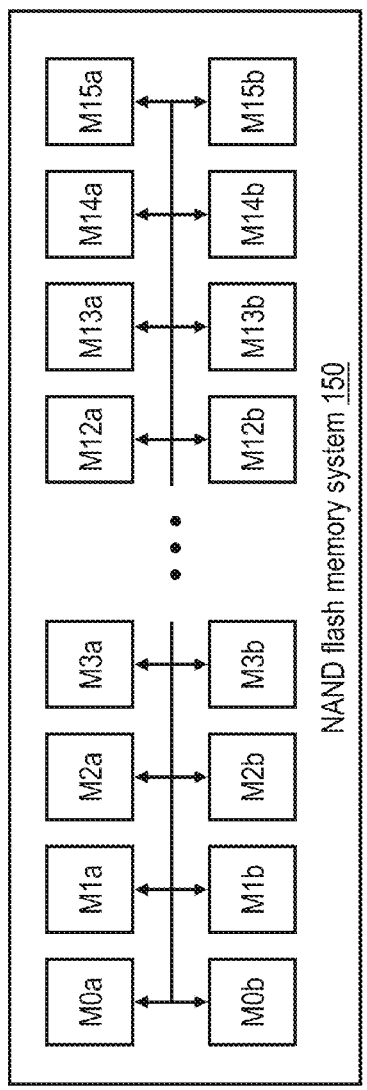
FIGS. 2-5 illustrate an exemplary arrangement of physical memory within a NAND flash memory system in accordance with the present disclosure.

As shown in FIG. 2, NAND flash memory array 140 may be formed from thirty-two (32) individually addressable NAND flash memory storage devices. In the illustrated example, each of the flash memory storage devices M0a-M15b takes the form of a board-mounted flash memory module, for example, a Single Level Cell (SLC), Multi-Level Cell (MLC), Three Level Cell (TLC), or Quad Level Cell (QLC) NAND flash memory module. The thirty-two NAND flash memory modules are arranged in sixteen groups of two (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the memory modules corresponding to the individual lanes at, or very nearly at, the same time.

Figure 3:
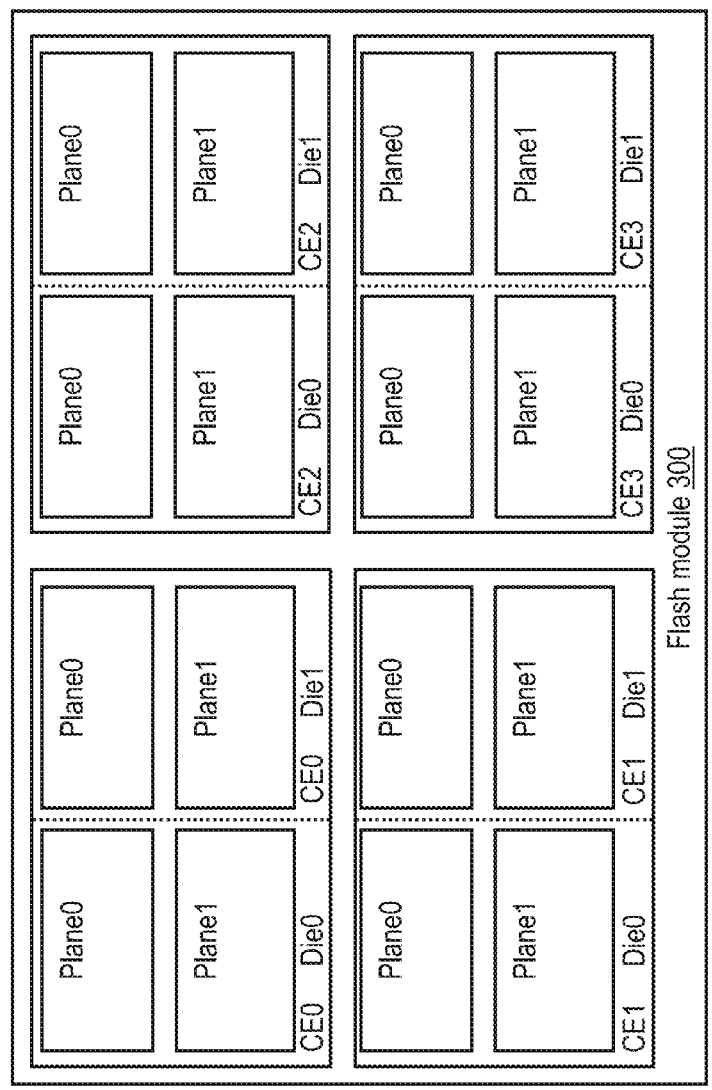

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
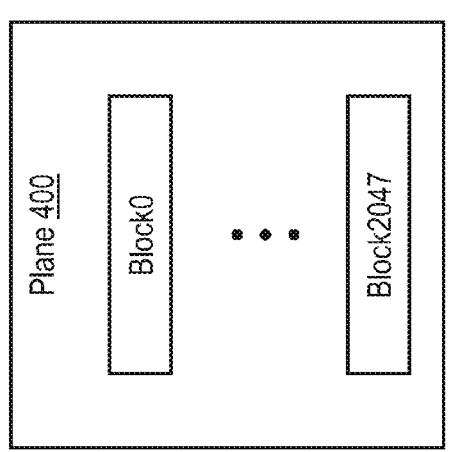
Figure 5:
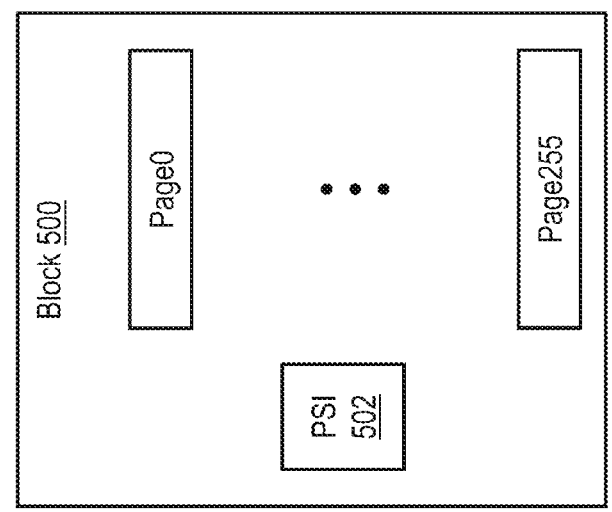

As further shown in FIGS. 4-5, an exemplary plane 400, which can be utilized to implement any of the planes within flash memory module 300 of FIG. 3, includes, for example, 2048 blocks of physical memory. In general, a block 500 is a collection of physical pages that are associated with one another, typically in a physical manner. This association is such that a block is defined to be the smallest granularity of physical storage locations that can be erased within NAND flash memory array 140. In the embodiment of FIG. 5, each block 500 includes, for example, 256 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory array 140 on a page-by-page basis, but erased on a block-by-block basis. As further shown in FIG. 5, each block 500 preferably includes page status information 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in a flash controller memory 142).

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory array 140). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclical Redundancy Check (CRC) or Longitudinal Redundancy Check (LRC), and parity.

In some embodiments, data is written to NAND flash memory array 140 one physical page at a time. In other embodiments in which more robust error recovery is desired, data is written to groups of associated physical pages of NAND flash memory array 140 referred to herein as "page stripes." In a preferred embodiment, all pages of a page stripe are associated with different lanes to achieve high write bandwidth. Because in many implementations the smallest erase unit is a block, page stripes are grouped into a block stripe as is shown in FIG. 6A, where each block in the block stripe is associated to a different lane. When a block stripe is built, any free block of a lane can be chosen, but preferably all blocks should have the same or similar health grade. Note that the block selection can be further restricted to be from the same plane, die, and/or chip enable. Once a block from each lane has been picked, page stripes are preferably formed from pages with the same page number from all blocks in the block stripe. While the lengths of the various page stripes stored into NAND flash memory array 140 can and preferably do vary, in one embodiment each page stripe includes two to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN-1) and one data protection page (i.e., PpageN). The addition of a data protection page as illustrated requires that garbage collection be performed for all page stripes of the same block stripe at the same time. After garbage collection of the block stripe completes, the block stripe can be dissolved, and each block can be placed into the read-to-use (RTU) queue as explained below.

FIG. 7 illustrates an exemplary format of each data page within page stripe 610 of FIG. 6. In this example, each data page 700 includes a 16 kB data field 702, as well as additional fields for metadata describing the data page. In the illustrated example, these metadata fields include an LBA field 704 containing the LBAs stored in data page 700, a sequence number field 705 containing the sequence number of the data page 700 in the page stripe 610, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706.

FIG. 8 depicts an exemplary format of the data protection page of page stripe 610 of FIG. 6. In the depicted example, data protection page 800 includes a data XOR field 802 that contains the bit-by-bit Exclusive Or (XOR) of the contents of the data fields 702 of the data pages 700 in page stripe 610. Data protection page 800 further includes an LBA XOR field 804, which contains the bit-by-bit XOR of the LBA fields 704 of the data pages 700 in page stripe 610, and a sequence number XOR field 805, which contains the bit-by-bit XOR of sequence number fields 705 of the data pages 700 in page stripe 610. Data protection page 800 finally includes a CRC field 806 and ECC field 808 for respectively storing a CRC value and an ECC value for data protection page 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data page allows the correction of some number of bit errors within the flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data page and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by a flash controller 140 in accordance with one embodiment.

As noted above, data storage system 120 does not generally allow external devices to directly address and/or access the physical memory locations within NAND flash memory arrays 150. Instead, data storage system 120 is generally configured to present a single contiguous logical address space to the external devices, thus allowing host devices to read and write data to and from LBAs within the logical address space while permitting data storage system 120 to control where the data that is associated with the various LBAs actually resides in the physical memory locations comprising NAND flash memory arrays 150. In this manner, performance and longevity of NAND flash memory arrays 150 can be intelligently managed and optimized. In the illustrated embodiment, logical-to-physical translation is performed in each NAND flash memory system 150 using a logical-to-physical translation data structure, such as logical-to-physical translation (LPT) table 900, which can be stored in flash controller memory 142. As described further below with reference to FIG. 11, flash controller 140 responds to unmap commands, which may be received, for example, from system management controller 123 via a RAID controller 124, by disassociating specified LBAs and physical memory locations in LPT table 900. In addition, an initialization function 922 of flash controller 140 responds to initialization commands, which may also be received, for example, from system management controller 123 via a RAID controller 124, by initializing data storage in the associated NAND flash memory system 150, as described further below with reference to FIG. 10.

Flash controller 140 tracks erased blocks of NAND flash memory system 150 that are ready to be used in ready-to-use (RTU) queues 906, which may be stored, for example, in flash controller memory 142. In the depicted embodiment, flash controller 140 maintains one RTU queue 906 per channel, and an identifier of each erased block that is to be reused is enqueued in the RTU queue 906 corresponding to its channel. A build block stripes function 920 of flash controller 140 constructs new block stripes for storing data and associated parity information from the erased blocks enqueued in RTU queues 906. As noted above with reference to FIG. 6A, block stripes are preferably formed of blocks residing in different channels, meaning that build block stripes function 920 can conveniently construct a block stripe by drawing each block of the new block stripe from a different RTU queue 906. In general, build block stripes function 920 attempts to construct stripes from blocks of approximately equal health (i.e., expected remaining useful life).

In response to write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe to store the write data of the write IOP and any non-updated (i.e., still valid) data from an existing page stripe, if any, targeted by the write IOP. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured access frequency) of the LBA of the write data. Data placement function 910 then writes the write data, associated metadata (e.g., CRC and ECC values), and parity information for the page stripe in the allocated page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash controller 140 utilizes to facilitate garbage collection. Through the write process, pages are invalidated, and therefore portions of the NAND flash memory system 140 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash controller 140 logs the block stripes ready to be recycled in a relocation queue 904, which can conveniently be implemented in the associated flash controller memory 142.

Flash controller 140 includes a relocation function 914 that relocates the data held in block stripes enqueued in relocation queue 904. To relocate such data, relocation function 914 updates LPT table 900 to remove the current association between the logical and physical addresses of the data. In addition, relocation function 914 issues relocation write requests to data placement function 910 to request that the data of the old block stripe be written to a new block stripe in NAND flash memory system 150. Once the data has been moved from the old block stripe, the old block stripe is passed to dissolve block stripes function 916, which decomposes the old block stripe into its constituent blocks, thus disassociating the blocks. Each of the blocks formerly forming the dissolved block stripe is then erased. Based on the health metrics of each erased block, each erased block is either retired (i.e., withdrawn from use) by a block retirement function 918 of flash controller 140, or alternatively, prepared for reuse by placing the block on the appropriate ready-to-use (RTU) queue 906 in the associated flash controller memory 142.

Figure 9:
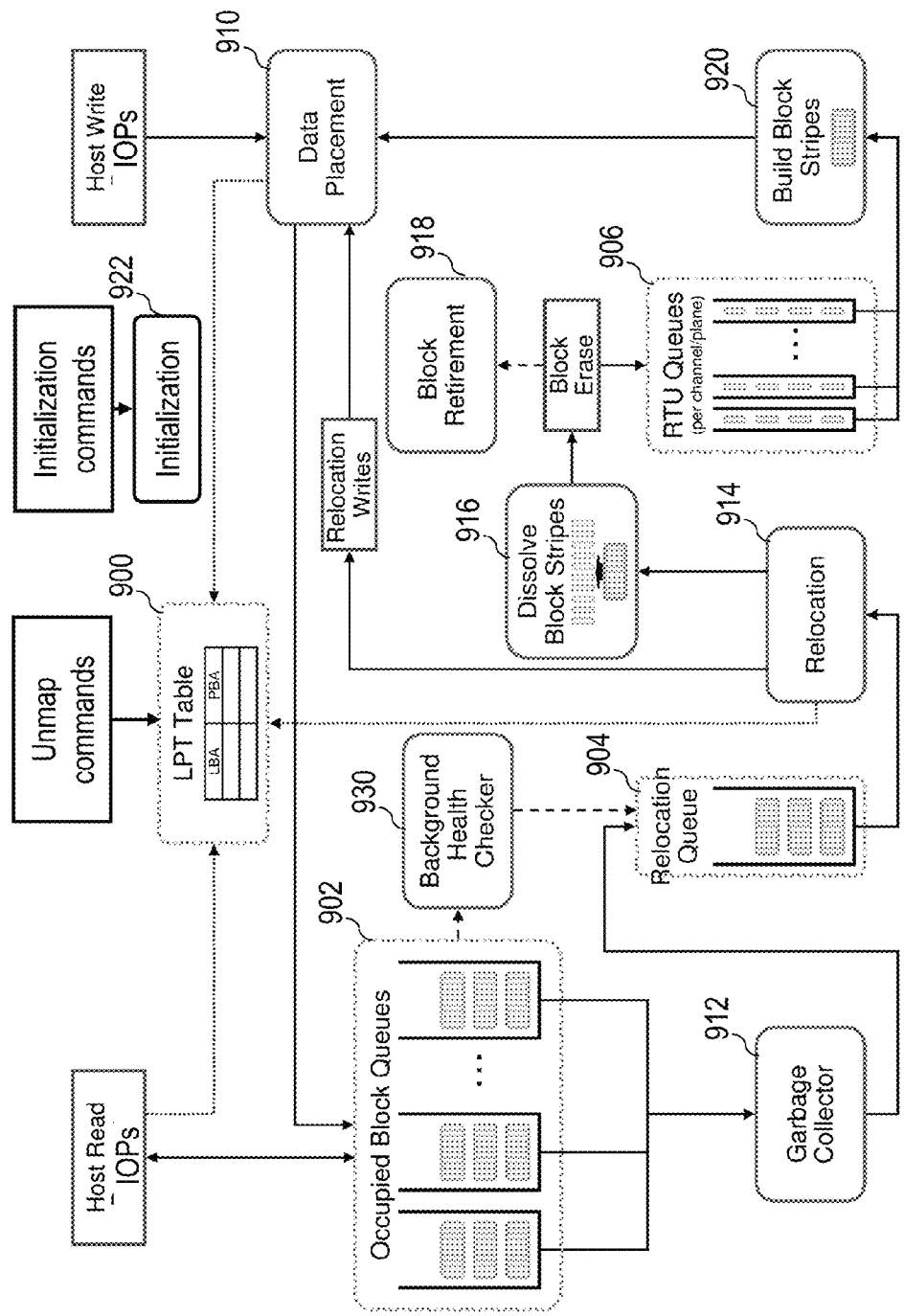
FIG. 9 is a high level flow diagram of the flash management functions and data structures employed by a flash controller in accordance with one embodiment.

As further shown in FIG. 9, flash controller 140 includes a background health checker 930. Background health checker 930, which operates independently of the demand read and write IOPs of hosts such as processor systems 102, continuously determines one or more metrics of health for blocks belonging to block stripes recorded in occupied block queues 902. Based on the one or more of the health metrics, background health checker 930 places block stripes on relocation queue 904 for handling by relocation function 914.

Figure 10:
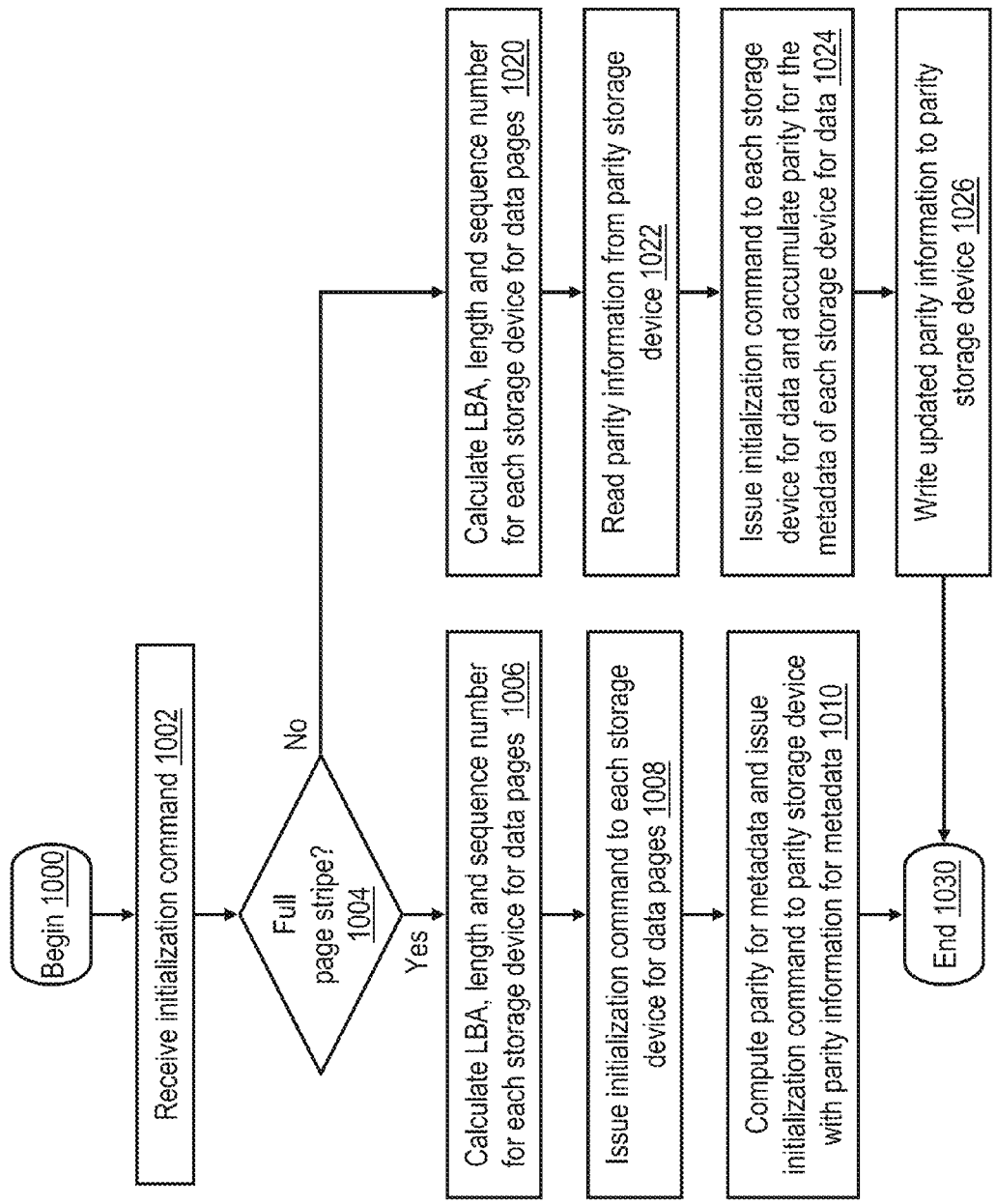
FIG. 10 is a high level logical flowchart of an exemplary process of storage initialization in a data storage system in accordance with one embodiment.

Referring now to FIG. 10, there is depicted a high level logical flowchart of an exemplary process of storage initialization in a data storage system, such as data storage system 120, in accordance with one embodiment. The illustrated process can be performed, for example, by one or more storage controllers, such as a system management controller 123, RAID controller 124 and/or flash controller 140. In the following description, it will be assumed that the storage initialization process is initiated by a higher level controller such as storage management controller 123, for example, in response to receipt by data storage system 120 of one or more inputs received from a host or management console, such as a processor system 102. The one or more inputs may, for example, request allocation of a logical volume of a specified size or request access to a portion of a thinly provisioned logical volume that has not yet been allocated physical storage within data storage system 120. In response to the one or more inputs, the higher level controller, such as storage management controller 123, issues one or more initialization commands to one or more lower level controllers, such as RAID controllers 124, which in the following description, are assumed to in turn issue initialization command(s) to one or more still lower level controllers, such as flash controllers 140, for processing. In other embodiments, it should be appreciated that some of the steps illustrated in FIG. 10 can alternatively be performed directly by one or more RAID controllers 124. Further, although in the following description, the basic granule upon which initialization is performed by a flash controller 140 is a page stripe, it should be appreciated that in other embodiments the initialization granule may be a block stripe or some other quantity of physical storage.

The process of FIG. 10 starts at block 1000 and then proceeds to block 1002, which illustrates a flash controller 140 receiving an initialization command from a RAID controller 124. The initialization command may specify or reference one or more parameters, such as an LBA to be associated with the beginning of a storage extent to be initialized, a length of the storage extent to be initialized, and a sequence number to be assigned to a first page in the storage extent. It should be noted that the initialization command is preferably dataless in that no initialization data is referenced by the initialization command or transmitted to flash controller 140 in conjunction with the initialization command. At block 1004, flash controller 140 determines whether or not the length of the storage extent to the initialized corresponds to a full page stripe (of whatever length). In response to a determination at block 1004 that the length of the storage extent corresponds to a full page stripe, flash controller 140 initializes the storage extent as depicted at blocks 1006-1010. Alternatively, in response to a determination at block 1004 that the length of the storage extent does not correspond to a full page stripe, flash controller 140 initializes the storage extent as depicted at blocks 1020-1026.

Referring first to block 1006, flash controller 140 calculates the LBA, extent length and sequence number for each storage device (e.g., flash storage module) allocated to store a data page of the page stripe. At block 1008, flash controller 140 then issues an initialization command to each storage device for data pages, thus erasing the data pages (e.g., writing the data pages to all zeros). In addition, at block 1010, flash controller 140 computes the parity for the metadata of the data pages, for example, by performing a bitwise XOR of LBA fields 704 of all of the initialized data pages 700 to obtain the value to be written to LBA XOR field 804 and by performing a bitwise XOR of sequence number fields 705 of all of the initialized data pages 700 to obtain the value to be written to sequence number XOR field 805. It should be noted that the value for data XOR field 802 need not be explicitly computed because all of data fields 702 are known to be initialized to all zeros, meaning that data XOR field 802 is known a priori to have a value of all zeros. Flash controller 140 then issues an initialization command to write data XOR field 802 to all zeros and to write the values computed for LBA XOR field 804 and sequence number XOR field 805 to the parity page 800 of the page stripe. Thereafter, the initialization process of FIG. 10 ends at block 1030.

Referring now to block 1020, in the case that the initialization command specifies initialization of less than full page stripe, flash controller 140 calculates the LBA, extent length, and sequence number for each storage device (e.g., flash storage module) that will store a data page of the initialized storage extent. At block 1022, flash controller 140 reads parity information for the page stripe containing the storage extent to be initialized. Flash controller 140 then issues an initialization command to initialize each data page in the storage extent, thus erasing those data pages (e.g., writing the data pages to all zeros) (block 1024). As further shown at block 1024, flash controller 140 computes the parity for the metadata of the data pages, for example, by performing a bitwise XOR of LBA fields 704 of all of the initialized data pages 700 with the prior value of LBA XOR field 804 to obtain the new value to be written to LBA XOR field 804 and by performing a bitwise XOR of sequence number fields 705 of all of the initialized data pages 700 with the prior value of sequence number XOR field 805 to obtain the new value to be written to sequence number XOR field 805. It should be noted that the value for data XOR field 802 need not be recomputed because all of the newly initialized data fields 702 are all zeros, meaning that the content of the data XOR field 802 of the parity page 800 remains unchanged. Flash controller 140 then issues an initialization command to write the new values computed for LBA XOR field 804 and sequence number XOR field 805 to the parity page 800 of the page stripe (block 1026). Thereafter, the initialization process of FIG. 10 ends at block 1030.

Thus, in accordance with the process of FIG. 10, a storage extent can be initialized directly by a storage controller without requiring slower software-controlled provisioning, as employed in the prior art. Further, the efficiency of the initialization process is increased by eliminating the need to pass initialization data to RAID controllers 124 and flash cards 126.

In a preferred embodiment, the storage extents to which the initialization process of FIG. 10 are applied have previously been unmapped by an unmapping process, such as the exemplary unmapping process described below with reference to FIG. 11. Unmapping LBAs as soon as they are freed returns data storage capacity to the pool of free storage (e.g., in RTU queues 906), which can improve the write performance of the NAND flash memory system 150. Further, assuming LBAs undergoing initialization are always unmapped allows RAID controllers 124 to avoid reading the data drive(s) to perform the parity update in the non-full stripe case. Thus, during initialization of full page stripes or non-full page stripes, the updated parity value can be calculated directly from the sequence numbers without having to read the data pages of the page stripe.

Figure 11:
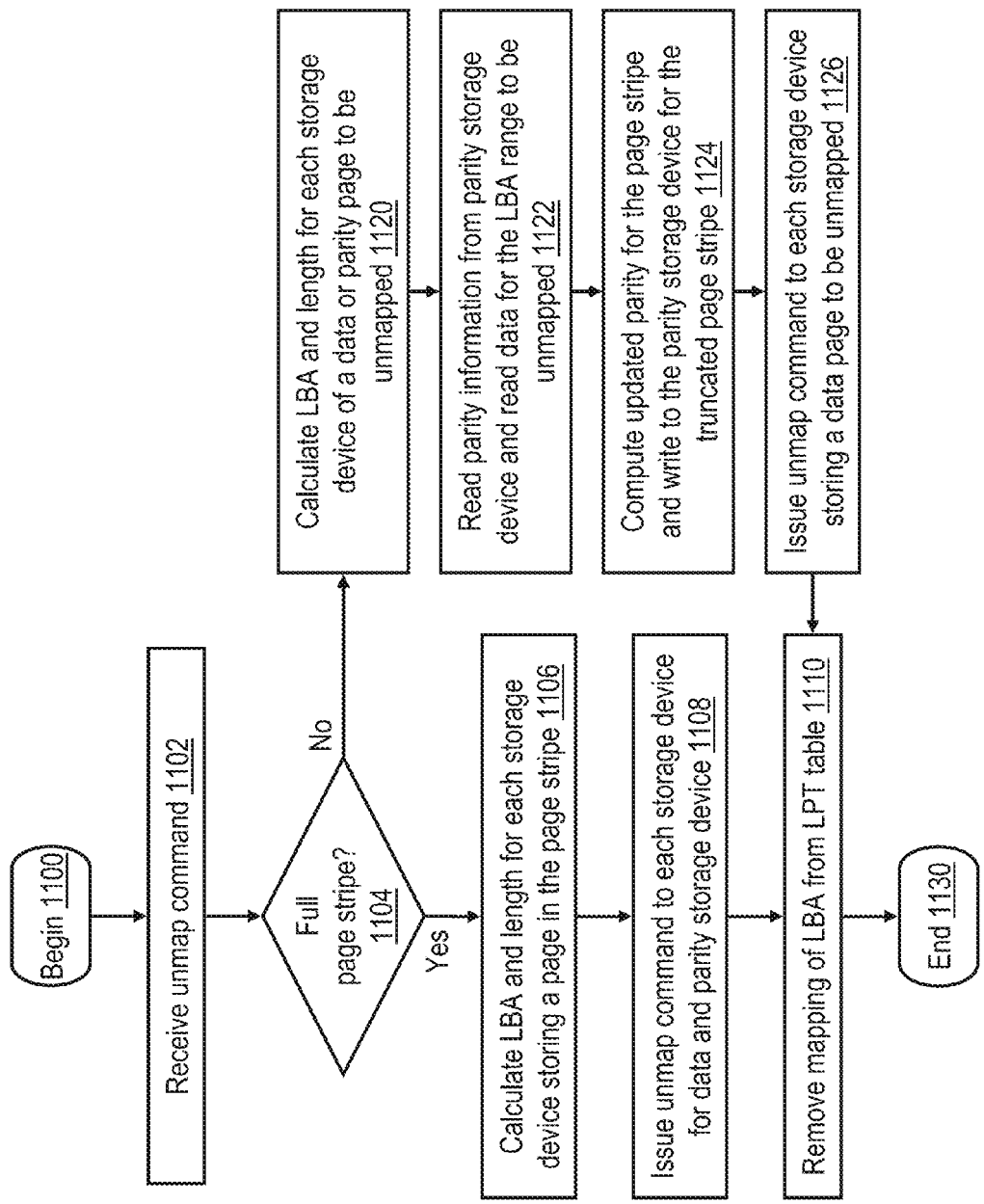
FIG. 11 is a high level logical flowchart of an exemplary process of freeing storage in a data storage system in accordance with one embodiment.

With reference now to FIG. 11, there is illustrated a high level logical flowchart of an exemplary process of freeing storage in a data storage system in accordance with one embodiment. The illustrated process can be performed, for example, by one or more storage controllers, such as a system management controller 123, RAID controller 124 and/or flash controller 140. In the following description, it will be assumed that the unmapping process is initiated by a higher level controller, such as storage management controller 123, for example, in response to receipt by data storage system 120 of one or more inputs received from a host or management console, such as a processor system 102. The one or more inputs may, for example, request allocation or deallocation of a logical volume of a specified size. In response to the one or more inputs, a higher level controller, such as storage management controller 123, issues one or more unmap commands to one or more lower level controllers, such as RAID controllers 124, which in the following description, are assumed to issue one or more corresponding unmap commands to one or more still lower level controllers, such as flash controllers 140, for processing. In other embodiments, it should be appreciated that some of the steps illustrated in FIG. 11 can alternatively be performed directly by one or more RAID controllers 124. Further, although in the following description, the basic granule upon which unmapping is performed is a page stripe, it should be appreciated that in other embodiments the granule may be a block stripe or some other quantity of physical storage.

The process of FIG. 11 begins at block 1100 and then proceeds to block 1102, which depicts a flash controller 140 receiving an unmap command from a RAID controller 124. The unmap command may specify or reference one or more parameters, such as an LBA to be associated with the beginning of a storage extent to be unmapped and a length of the storage extent to be unmapped. At block 1104, flash controller 140 determines whether or not the length of the storage extent to be unmapped corresponds to a full page stripe (of whatever length). In response to a determination at block 1104 that the length of the storage extent corresponds to a full page stripe, flash controller 140 unmaps the storage extent as depicted at blocks 1106-1110. Alternatively, in response to a determination at block 1104 that the length of the storage extent does not correspond to a full page stripe, flash controller 140 unmaps the storage extent as depicted at blocks 1120-1126.

Referring first to block 1106, flash controller 140 calculates the LBA and extent length for each storage device (e.g., flash storage module) from which a data page or parity page belonging to the page stripe is to be unmapped. As shown at blocks 1108 and 1110, flash controller 140 then issues unmap commands to unmap each of the data pages and parity page, which are serviced by LPT table 900 removing the association between the specified LBAs and physical storage addresses in NAND flash memory system 150. It should be noted that no initialization (erasure) of the data pages or parity page is performed, meaning that the physical pages of the page stripe retain their original data. Thereafter, the unmapping process of FIG. 11 ends at block 1130.

Referring now to block 1120, in the case that the unmap command specifies unmapping of less than a full page stripe, flash controller 140 calculates the LBA, extent length, and sequence number for each storage device (e.g., flash storage module) that stores a data page to be unmapped. At block 1122, flash controller 140 reads the parity page of the page stripe containing the storage extent to be unmapped. In addition, flash controller 140 reads the data pages of the page stripe corresponding to the LBA range to be unmapped. At block 1124, flash controller 140 computes the updated values of fields 802, 804 and 805 of the parity page 800 for the truncated page stripe, for example, by performing a bitwise XOR of the data field 702, LBA field 704, and sequence number field 705 of all of the data pages 700 to be unmapped with the prior values of the corresponding fields 802, 804 and 805 in the parity page 800 of the page stripe.

By XORing the values of the data pages to be unmapped with the parity page in this manner, the effect of those data pages on the values recorded in the parity page is removed. Flash controller 140 then writes the updated values of fields 802, 804 and 805 to the parity page 800 of the page stripe. Flash controller 140 then issues one or more unmap commands to unmap the specified data pages of the page stripe (block 1126). As depicted at block 1110, these unmap command(s) are serviced by LPT table 900 removing the association between the specified LBAs and physical storage addresses in NAND flash memory system 150. Thereafter, the unmapping process of FIG. 11 ends at block 1130.

Following unmapping, if the flash controller 140 receives a read IOP directed to the unmapped LBA, the flash controller 140 synthesizes data of all zeroes without reading the physical storage media and returns the synthesized data to the requestor. Unmapping LBAs in this manner increases the amount of flash storage ready to be reclaimed by garbage collector 912, thus improving the performance of the NAND flash storage system 150 for write IOPs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system has a plurality of non-volatile storage devices, a higher level controller and one or more lower level controllers. In response to one or more inputs, the higher level controller of the data storage system issues an initialization command specifying initialization of a storage extent. In response to the initialization command, one or more lower level controllers issue dataless initialization commands to the plurality of non-volatile storage devices. In response to the dataless initialization commands, multiple first non-volatile storage devices among the plurality of non-volatile storage devices each initialize a respective data portion of the storage extent and a second non-volatile storage device among the plurality of non-volatile storage devices initializes a data protection portion of the storage extent.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that the inventions herein are not limited to use with NAND flash memory, but are instead applicable to any other non-volatile storage technologies including other non-volatile random access memory (NVRAM) technologies. For example, the disclosed techniques may be applied to phase-change memory (PCM), magnetoresistive RAM (MRAM) and resistive RAM (RRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system having a plurality of non-volatile storage devices, the method comprising:
the data storage system unmapping at least a portion of a storage extent;
thereafter, in response to at least one input, a higher level controller of the data storage system issuing an initialization command specifying initialization of the storage extent;
in response to the initialization command, at least one lower level controller issuing dataless initialization commands to the plurality of non-volatile storage devices; and
in response to the dataless initialization commands, multiple first non-volatile storage devices among the plurality of non-volatile storage devices each initializing a respective data portion of the storage extent and a second non-volatile storage device among the plurality of non-volatile storage devices initializing a data protection portion of the storage extent, wherein initializing the data protection portion includes:
computing a value of the data protection portion without reading the respective data portions of the storage extent stored by the multiple first non-volatile storage devices, wherein the computing includes computing a data protection value over sequence numbers associated with the data portions of the storage extent; and
writing the value of the data protection portion to the second non-volatile storage device.

2. The method of claim 1, wherein the unmapping comprises:
prior to initialization of the storage extent, the higher level controller of the data storage system issuing an unmapping command specifying unmapping of a logical address associated with at least a portion of the storage extent;
in response to the unmapping command, the at least one lower level controller issuing an unmapping command to unmap the at least a portion of the storage extent; and
in response to the unmapping command of the at least one lower level controller, removing a mapping of the logical address from a logical-to-physical translation data structure of the data storage system.

3. The method of claim 2, and further comprising:
in response to the unmapping command of the at least one lower level controller, updating the data protection portion of the storage extent.

4. The method of claim 1, wherein:
the storage extent contains less than all pages of a page stripe spanning the plurality of non-volatile storage devices.

5. A data storage system, comprising:
a higher level controller that, following unmapping of at least a portion of a storage extent and in response to at least one input, issues an initialization command specifying initialization of the storage extent; and
at least one lower level controller coupled to the higher level controller, wherein the at least one lower level controller, in response to the initialization command, issues dataless initialization commands to the plurality of non-volatile storage devices to cause multiple first non-volatile storage devices among the plurality of non-volatile storage devices to each initialize a respective data portion of the storage extent and a second non-volatile storage device among the plurality of non-volatile storage devices to initialize a data protection portion of the storage extent, wherein the at least one lower level controller initializes the data protection portion by computing a value of the data protection portion without reading the respective data portions of the storage extent stored by the multiple first non-volatile storage devices, said computing including computing a data protection value over sequence numbers associated with the data portions of the storage extent, and by writing the value of the data protection portion to the second non-volatile storage device.

6. The data storage system of claim 5, wherein:
the data storage system further comprises a logical-to-physical translation data structure;
prior to initialization of the storage extent, the higher level controller of the data storage system issues an unmapping command specifying unmapping of a logical address associated with at least a portion of the storage extent; and
the at least one lower level controller, in response to the unmapping command, issues an unmapping command to unmap the at least a portion of the storage extent by removing a mapping of the logical address from the logical-to-physical translation data structure of the data storage system.

7. The data storage system of claim 6, wherein the at least one lower level controller causes the data protection portion of the storage extent to be updated responsive to the unmapping command.

8. The data storage system of claim 5, wherein:
the storage extent contains less than all pages of a page stripe spanning the plurality of non-volatile storage devices.

9. The data storage system of claim 5, and further comprising the plurality of non-volatile storage devices coupled to the at least one lower level controller.

10. A program product, comprising:
a storage device; and
program code stored in the storage device, wherein the program code, when executed in a data storage system including a plurality of non-volatile storage devices, causes the data storage system to perform:
unmapping at least a portion of a storage extent;
thereafter, in response to at least one input, a higher level controller of the data storage system issuing an initialization command specifying initialization of a storage extent;
in response to the initialization command, at least one lower level controller issuing dataless initialization commands to the plurality of non-volatile storage devices; and
in response to the dataless initialization commands, multiple first non-volatile storage devices among the plurality of non-volatile storage devices each initializing a respective data portion of the storage extent and a second non-volatile storage device among the plurality of non-volatile storage devices initializing a data protection portion of the storage extent by computing a value of the data protection portion without reading the respective data portions of the storage extent stored by the multiple first non-volatile storage devices, said computing including computing a data protection value over sequence numbers associated with the data portions of the storage extent, and by writing the value of the data protection portion to the second non-volatile storage device.

11. The program product of claim 10, wherein the unmapping comprises:

prior to initialization of the storage extent, the higher level controller of the data storage system issuing an unmapping command specifying unmapping of a logical address associated with at least a portion of the storage extent;

in response to the unmapping command, the at least one lower level controller issuing an unmapping command to unmap the at least a portion of the storage extent; and in response to the unmapping command of the at least one lower level controller, removing a mapping of the logical address from a logical-to-physical translation data structure of the data storage system.

12. The program product of claim 11, wherein the program code further causes the data storage system to perform:

in response to the unmapping command of the at least one lower level controller, updating the data protection portion of the storage extent.

13. The program product of claim 10, wherein:

the storage extent contains less than all pages of a page stripe spanning the plurality of non-volatile storage devices.

* * * * *